United States Patent Office 3,272,826
Patented Sept. 13, 1966

3,272,826
SUBSTITUTED 4[PIPERIDYLIDENE(4')]-9,10-DIHYDRO-4H-BENZO [4,5] CYCLOHEPTA [1,2-b] THIOPHENE AND THE 4 PIPERIDYL 4 OL COMPOUNDS
Ernst Jucker, Ettingen, Basel-Land, Anton Ebnöther, Reinach, Basel-Land, André Stoll and Jean-Michel Bastian, Birsfelden, Basel-Land, and Erwin Rissi, Basel, Switzerland, assignors to Sandoz Ltd. (also known as Sandoz A.G.), Basel, Switzerland
No Drawing. Filed Aug. 29, 1963, Ser. No. 305,522
Claims priority, application Switzerland, Aug. 31, 1962, 10,377/62
7 Claims. (Cl. 260—293.4)

The present invention relates to new thiophene derivatives, their acid addition salts, and pharmaceutical compositions containing as an essential active ingredient said thiophene derivative or a non-toxic pharmaceutically acceptable acid addition salt in an inert carrier or vehicle prepared in unit dosage form.

The present invention provides compounds of the formula:

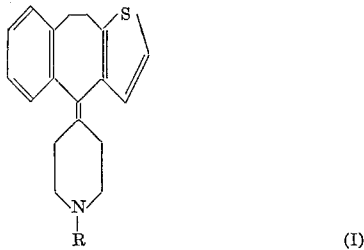

in which R is a lower alkyl, their acid addition salts and pharmaceutical compositions containing, in addition to an inert carrier, a compound I and/or an acid addition salt thereof.

The production of compounds I and their acid addition salts is carried out by splitting off the elements of water from a compound of the formula:

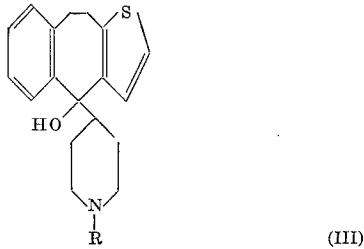

in which R has the above significance, and, when an acid addition salt is required, acid addition salt formation is effected in a manner known per se.

Suitable acids for the salification are, for example, hydrochloric, hydrobromic, sulfuric, citric, tartaric succinic, maleic, malic, acetic, benzoic, hexahydrobenzoic, methanesulfonic, fumaric, gallic and hydriodic acid. The term "known" as used herein designates a method described in the literature on the subject or in actual use.

The production of compounds (III) and their acid addition salts, which are also new, is carried out by condensation of 9,10-dihydro-4H-benzo[4,5]cyclohepta[1,2-b]thiophen-(4)-one with a compound of the formula:

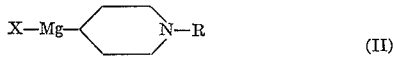

in which R has the above significance and X is chlorine, bromine or iodine, and hydrolysis of the so-obtained condensation product, and, when an acid addition salt is required, salt formation is effected in a manner known per se.

The process is carried out, for example, by adding dropwise a solution of 9,17-dihydro-4H-benzo[4,5]cyclohepta [1,2-b]thiophen-(4)-one in an inert organic solvent to a solution of a compound (II) in an inert organic solvent and allowing the reaction mixture to stand for some time at room temperature, and/or heating to the boil; the resulting reaction product is hydrolysed, e.g. by treatment with ice cold aqueous ammonium chloride solution, and the resulting compound (III) isolated from the aqueous solution by a method known per se and purified, whereafter the compound (I) can be obtained by the action of a water removing agent, for example mineral acids, strong acids, acetic acid anhydrides, thionyl chloride or phosphorus oxychloride.

The compounds (I) are crystalline or oily at room temperature; in general, they form stable salts which are crystalline at room temperature with inorganic or organic acids. The compounds (II) are in general crystalline at room temperature and also form stable salts which are crystalline at room temperature with inorganic or organic acids.

The compounds (I) as well as the compounds (III) have a strong antihistaminic action, a property useful in pharmaceuticals for the treatment of hay-fever, bronchial asthma and migraine.

The compounds (I) as well as the compounds (III) may be worked up in the form of pharmaceutical preparations. These contain one of the compounds of the invention in unit dosage form in admixture with an organic or inorganic carrier which is suitable for enteral, parenteral or local application and which does not react with the compound (I) or (III) e.g. gelatine, lactose, starch, magnesium stearate, talc, vegetable oils, benzyl alcohols, gum arabic, polyalkylene glycols, petroleum jelly, cholesterol or other known pharmaceutical carriers. The pharmaceutical preparations may, for example, be in the form of tablets, dragées, powders, creams, suppositories or in liquid form as solutions, suspensions or emulsions; they may, if desired, be sterilized and/or contain adjuvants such as preserving agents, stabilizers, wetting agents or emulsifiers, or other therapeutically active substances.

The invention thus further provides pharmaceutical preparations containing, in addition to an inert carrier, a compound (I) or a compound (III) respectively or an addition salt or quaternary ammonium compound thereof.

9,10 - dihydro - 4H - benzo[4,5]cyclohepta[1,2 - b]thiophen-(4)-one is a hitherto unknown compound; it may be produced by the following method, which also forms part of the invention:

Thenylidene-(2)-phthalide or o-[2-thienyl-(2') - ethylene]-benzoic acid is reduced to o-[2-thienyl-(2')-ethyl]-benzoic acid and this acid then subjected to intramolecular ring closure with a suitable condensation agent, e.g. polyphosphoric acid or sulphuric acid; the thenylidene-(2)-phthalide itself may be obtained by reaction of thienyl-(2)-acetic acid with phthalic acid anhydride, while the o-[2-thienyl-(2')-ethylene]-benzoic acid may be obtained by reaction of thenyl-diethyl-phosphonate with o-phthalaldehydic acid.

In the following non-limitative examples, all temperature data are in degrees centigrade. Melting points are uncorrected.

*Example 1.—4-[1'-methyl-piperidylidene-(4')]-9,10-dihydro-4H-benzo[4,5]cyclohepta[1,2 - b]thiophene hydrochloride*

(a) *Thenylidene - (2) - phthalide.*—24.2 g. of thienyl-(2)-acetic acid, 52.0 g. of phthalic acid anhydride, 4.0 g. of anhydrous sodium acetate and 125 ml. of 1-methyl-pyrrolidone-(2) are heated while stirring in an open flask for 3 hours to 205–208°, while nitrogen is passed through. It is then cooled and the viscous reaction mixture poured into 1 litre of water. The precipitated substance is filtered off, washed with water and then dissolved in 200 ml. of chloroform. After filtering off some undissolved substance, shaking is effected twice with 100 ml. of 2 N sodium carbonate solution and then with water, drying is then carried out over sodium sulphate and evaporation in order to reduce the volume. The crude phthalide is repeatedly recrystallized from ethanol, while treating with animal charcoal. It melts at 114–115°.

(b) *o-[2-thienyl-(2)-ethyl]-benzoic acid.*—24.0 g. of thenylidene-(2)-phthalide, 8.8 g. of red pulverised phosphorus, 240 ml. of hydroiodic acid ($d=1.7$) and 240 ml. of glacial acetic acid are heated to boiling under nitrogen and while stirring vigorously. 70 ml. of toluene are then added and 6.0 g. of red phosphorus added in small portions over a period of one hour. It is then poured into 3 litres of ice water, stirred with 300 ml. of chloroform and the phosphorus removed by filtration. The chloroform phase is then removed, the aqueous phase extracted twice more with 200 ml. of chloroform and the united extracts shaken out 4 times, each time with 200 ml. of 2 N sodium hydroxide solution. The alkaline solution is then rendered acid to Congo red reagent, using hydrochloric acid and extracted three times with chloroform. After drying over sodium sulphate and evaporating the solvent, the residue is chromatographed on aluminium oxide (Activity Stage V). The substance eluted with benzene and benzene/chloroform (1:1) is recrystallized from chloroform/hexane (1:1); M.P. 107–109°.

(c) *9,10 - dihydro - 4H - benzo[4,5]cyclohepta[1,2 - b] thiophen-(4)-one.*—200 ml. of 85% phosphoric acid and 112 g. of phosphorus pentoxide are heated to 135°. 7.0 g. of o-[2-thienyl-(2')-ethyl]-benzoic acid are then introduced while stirring thoroughly over a period of 30 minutes. Stirring is then continued for another hour at 135° and the reaction mixture is then stirred into 1 litre of ice water. Extraction is then effected three times, using 250 ml. ether portions, the ethereal extract is washed with 2 N sodium carbonate solution, dried over sodium sulphate and reduced in volume by evaporation. The residue is boiled up with 55 ml. of ethanol, the solution freed of resin by decanting and then stirred at room temperature for 6 hours with animal charcoal. It is then filtered off, reduced in volume in a vacuum and the residue distilled. B.P. 120–124°/0.005 mm., $n_D^{24.5}=1.6559$.

(d) *4-[1'-methyl-piperidyl-(4')] - 9,10 - dihydro - 4H-benzo[4,5]cyclohepta[1,2-b]thiophen-(4)-ol.*—0.94 g. of magnesium filings which have been activated with iodine are covered with a layer of absolute tetrahydrofuran and etched with a few drops of ethylene bromide. A solution of 5.0 g. of 1-methyl-4-chloropiperidine in 5 ml. of tetrahydrofuran is then added dropwise and boiling then effected for a further 1 hour under reflux. After cooling to room temperature, the solution of 4.5 g. of 9,10-dihydro-4H-benzo[4,5]cyclohepta[1,2-b]thiophen-(4) - one in 5 ml. of tetrahydrofuran is added dropwise. Stirring is carried out first for 3 hours at room temperature and then for two hours at boiling temperature, it is then cooled and poured into 300 ml. of ice-cold 20% ammonium chloride solution. It is then shaken out with methylene chloride, the methylene chloride solution washed with water and shaken three times with 30 ml. portions of aqueous 2 N tartaric acid solution. The tartaric acid extract is rendered alkaline while cooling thoroughly and then extracted twice with methylene chloride. After washing with water, drying over potassium carbonate and reducing in volume by evaporation, the residue is recrystallized from ethanol. M.P. 197–199°.

(e) *4 - [1' - methyl - piperidylidene - (4')] - 9,10-dihydro - 4H - benzo[4,5]cyclohepta[1,2 - b]thiophene hydrochloride.*—2 g. of 4-[1'-methyl-piperidyl-(4')]-9,10 - dihydro - 4H - benzo[4,5]cyclohepta[1,2-b]thiophen-(4)-ol, 60 ml. of glacial acetic acid and 20 ml. of concentrated hydrochloric acid are boiled for 30 minutes under reflux. After evaporating in a vacuum, the residue is triturated with 3 ml. of acetone, the precipitated hydrochloride is then filtered off and it is recrystallized from isopropanol/ether. M.P. 261–263° (decomposition).

*Example 2.—4 - [1' - n - butyl - piperidylidene - (4')]-9, 10 - dihydro-4H-benzo[4,5]cyclohepta[1,2-b]thiophene hydrochloride*

(a) *Thenyl-diethyl-phosphonate.*—133 g. of thenylchloride (B.P. 73–75°/15 mm.) are heated to 150°, and 175 g. of freshly distilled triethylphosphite slowly added dropwise while stirring at this temperature, followed by further heating for 2 hours to 160–170° while stirring. The reaction mixture is then distilled in a high vacuum; the thenyl-diethyl-phosphonate boils at 120–124°/0.06 mm.

(b) *o - [2 - thienyl - (2') - ethylene] - benzoic acid.*—30 g. of powdered, well-dried sodium methylate are added to a solution of 117 g. of thenyl-diethyl-phosphonate in 200 ml. of freshly distilled dimethylformamide, whereupon the temperature of the solution rises to 45–50°. The flask is then placed in an ice bath and a solution of 80 g. of o-phthalaldehydic acid in 200 ml. of dimethylformamide added dropwise so that the temperature remains between 35–40° and stirring then continued for ½ to 1 hour at room temperature. 1600 ml. of water (temperature 10–15°) are now added to the reaction solution, while cooling thoroughly, whereupon a red oil separates. It is then rendered alkaline with potassium carbonate, whereupon the oil redissolves; the red-brown solution is shaken out three times with benzene and the aqueous solution carefully adjusted to a pH value of 4 at 10–15° with hydrochloric acid. After several hours in a refrigerator, the precipitated acid is filtered off, dried and recrystallized from benzene. M.P. of the o-[2-thienyl-(2')-ethylene]-benzoic acid 133–135°.

The mother liquor is shaken out three times with methylene chloride, the organic phase dried over sodium sulphate and reduced in volume by evaporation in a vacuum. The residue is crystallized from benzene, whereupon a further portion of acid is obtained having a M.P. of 133–135°.

(c) *o-[2-thienyl-(2')-ethyl]-benzoic acid.*—7.5 g. of sodium are melted under dry toluene and 375 g. of pure mercury are added dropwise while shaking at frequent intervals so that the toluene boils. The mixture is then heated while stirring to 120–140° and cooled as soon as all the toluene has distilled off, down to a temperature of 50°. The homogeneous amalgam is now covered with a layer of a solution of 20 g. of o-[2-thienyl-(2')-ethylene]-benzoic acid in 150 ml. of 95% ethanol and the mixture shaken for ½ hour. The mercury is then separated, washed twice with ethanol and the united ethanolic solutions diluted with 1200 ml. of water. The solution is filtered through Hyflo, acidified with hydrochloric acid and cooled to 5°. After several hours, the precipitated acid is filtered off and recrystallized from chloroform/hexane. M.P. 110–111°.

(d) *9,10 - dihydro - 4H - benzo[4,5]cyclohepta[1,2-b] thiophen - (4) - one.*—59 ml. of 84% phosphoric acid and 86 g. of phosphorus pentoxide are first stirred for ½ hour at 125–130°. 20 g. of powdered o-[2-thienyl-(2')-ethyl]-benzoic acid are then introduced over a period of ½ hour at this temperature. The reaction mixture is stirred for a further 2 hours at 125–130°, it is then poured into 1 litre of water, the solution filtered through Hyflo and extracted three times with methylene chloride. The organic phase is washed with 2 N sodium carbonate solution, dried over magnesium sulphate, the solvent is removed by evaporation and the residue is distilled in a high vacuum, whereupon the 9,10-dihydro-4H-benzo[4,5] cyclohepta[1,2-b]thiophen-(4)-one distills over as a green oil at 125–140°/0.05 mm. $n_D^{24}$=1.6559.

(e) *4 - [1' - n - butyl - piperidyl - (4')] - 9,10-dihydro-4H - benzo[4,5]cyclohepta[1,2 - b]thiophen-(4) - ol.*— 1.25 g. of iodine activated magnesium are covered with a layer consisting of a little absolute tetrahydrofuran and etched with a few drops of ethylene bromide. After reaction has commenced, a solution of 8.8 g. of 1-n-butyl-4-chloro-piperidine in 10 ml. of tetrahydrofuran is added dropwise so that the reaction mixture boils. It is heated for a further hour under reflux, cooled down, and a solution of 6.0 g. of 9,10-dihydro-4H-benzo[4,5]cyclohepta[1,2-b]thiophen-(4)-one in 15 ml. of tetrahydrofuran are added dropwise while stirring over 15 minutes and heating carried out for a further 15 minutes to boiling.

After cooling, the reaction mixture is poured into 200 ml. of 20% aqueous ammonium chloride solution. 100 ml. of methylene chloride are added and all filtered through Hyflo, the organic phase is separated and the aqueous solution shaken out three times more with methylene chloride. The united organic phases are shaken out three times with 2 N tartaric acid, the united acid extracts slowly rendered alkaline with potassium hydroxide and extracted three times with ether. The residue left after drying and evaporating the ether is distilled in a high vacuum. The fraction which distills between 195–200° at 0.05 mm. Hg is crystallized and recrystallized from CCl₄/hexane. M.P. 107–108°.

(f) *4 - [1' - n - butyl - piperidylidene - (4')] - 9,10-dihydro - 4H - benzo[4,5]cyclohepta[1,2 - b]thiophene hydrochloride.*—A mixture of 5.0 g. of 4-[1'-butyl-piperidyl - (4')] - 9,10 - dihydro - 4H - benzo[4,5]cyclohepta[1,2-b]thiophen-(4)-ol, 90 ml. of glacial acetic acid and 30 ml. of concentrated hydrochloric acid is boiled under reflux for one hour. The reaction mixture is then reduced in volume by evaporation in a vacuum and the residue triturated with 3 ml. of acetone. The hydrochloride which crystallizes out on cooling is recrystallized from isopropanol/ether. M.P. 272–274° (decomposition).

What is claimed is:

1. A compound selected from the group consisting of an antihistaminic thiophene of the formula:

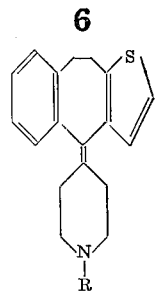

(I)

wherein R is a lower alkyl radical and the pharmaceutically acceptable acid addition salts of said thiophene.

2. 4 - [1' - methyl - piperidylidene - (4')] - 9,10-dihydro-4H-benzo[4,5]cyclohepta[1,2-b]thiophene.

3. 4 - [1' - n - butyl - piperidylidene - (4')] - 9,10 - dihydro-4H-benzo[4,5]cyclohepta[1,2-b]thiophene.

4. A compound selected from the group consisting of an antihistaminic thiophene of the formula:

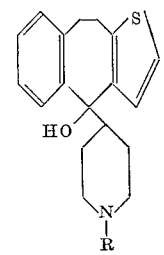

(III)

wherein R is a lower alkyl radical and the pharmaceutically acceptable acid addition salts of said thiophene.

5. 4 - [1' - methyl - piperidyl - (4')] - 9,10 - dihydro-4H-benzo[4,5]cyclohepta[1,2-b]thiophen-(4)-ol.

6. 4 - [1' - n - butyl - piperidyl - (4')] - 9,10 - dihydro-4H-benzo[4,5]cyclohepta[1,2-b]thiophen-(4)-ol.

7. 9,10 - dihydro - 4H - benzo[4,5]cyclohepta[1,2-b]thiophen-(4)-one.

References Cited by the Examiner
UNITED STATES PATENTS

| | | | |
|---|---|---|---|
| 2,813,873 | 11/1957 | Janot et al. | 260—293.4 |
| 2,937,118 | 5/1960 | Haxthausen et al. | 167—65 |
| 3,014,911 | 12/1961 | Engelhardt | 260—293 |
| 3,047,580 | 7/1962 | Sprague | 260—293.4 |
| 3,063,902 | 11/1962 | Gray et al. | 167—65 |

WALTER A. MODANCE, *Primary Examiner.*

ROBERT PRICE, AVROM D. SPEVACK,
*Assistant Examiners.*